United States Patent
Gandham et al.

(10) Patent No.: US 9,479,219 B1
(45) Date of Patent: Oct. 25, 2016

(54) VALIDATING A CONNECTION TO AN OPTICAL CIRCUIT SWITCH

(71) Applicant: Google Inc., Mountain View, CA (US)

(72) Inventors: Shashidhar Rao Gandham, Fremont, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 625 days.

(21) Appl. No.: 13/625,587

(22) Filed: Sep. 24, 2012

(51) Int. Cl.
*H04B 3/46* (2015.01)

(52) U.S. Cl.
CPC .................................. *H04B 3/46* (2013.01)

(58) Field of Classification Search
CPC ........ H04B 3/46; H04B 10/00; H04B 1/006; H04B 1/48; H04B 2203/5425; H04B 2003/5483; H04B 2203/5491; H04B 2203/5495; H04B 3/493; H04B 3/56; H04W 4/008; H04L 41/12; H04L 41/145; H04L 45/02; H04L 12/2697; H04L 41/5035; H04L 41/5074; H04L 43/0829; H04L 43/0882; H04L 43/50; H04L 45/00; H04L 45/125; H04L 45/22; H04L 45/28; H04L 45/62

See application file for complete search history.

(56) References Cited

U.S. PATENT DOCUMENTS

| | | | |
|---|---|---|---|
| 5,552,881 A * | 9/1996 | Jezwinski | G01M 11/3136 356/73.1 |
| 6,005,696 A * | 12/1999 | Joline et al. | 398/25 |
| 6,111,406 A * | 8/2000 | Garfunkel et al. | 324/210 |
| 6,834,139 B1 | 12/2004 | Prairie et al. | |
| 6,961,347 B1 | 11/2005 | Bunton et al. | |
| 7,480,251 B2 | 1/2009 | Foschiano et al. | |
| 7,623,784 B1 | 11/2009 | Pan et al. | |
| 7,656,823 B1 * | 2/2010 | Monga et al. | 370/255 |
| 7,689,121 B2 | 3/2010 | Peloso et al. | |
| 2012/0185624 A1 * | 7/2012 | Dang | G06F 13/40 710/104 |

OTHER PUBLICATIONS en.wikipedia.org/wiki/Fiber-optic_communication; "Fiber-optic communication," Wikipedia.org, retrieved Jun. 4, 2012, 12 pages.
Farrington, Nathan, et al.; "Helios: A Hybrid Electrical/Optical Switch Architecture for Modular Data Centers," Proceedings of the ACM SIGCOMM Conference, New Delhi, India, Aug. 2010, 12 pages.
http://en.wikipedia.org/wiki/Network_switch; "Network switch," Wikipedia.org, retrieved Jun. 4, 2012, 7 pages.
www.calient.net/products/s-series-photonic-switch/; "S Series Photonic Switch," Calient Technologies, retrieved Jun. 5, 2012, 2 pages.

* cited by examiner

*Primary Examiner* — Fan Ng
(74) *Attorney, Agent, or Firm* — McDermott Will & Emery LLP

(57) ABSTRACT

A system and method of validating a connection to an optical circuit switch include sending a packet of data through a first connection to the optical circuit switch to test whether the packet reaches a second connection to the optical circuit switch. The first connection may be selected for retesting with a third connection and a second packet of data may be sent to the third connection. Data indicative of the first connection being correctly wired may be generated based in part on a determination that the second packet reached the third connection.

18 Claims, 6 Drawing Sheets

VALIDATING A CONNECTION TO AN OPTICAL CIRCUIT SWITCH

BACKGROUND

The present disclosure relates generally to data networks. The present disclosure more specifically relates to validating a wired connection to an optical circuit switch in a data network.

Two computing devices may communicate via any number of different types of data networks. For example, a mobile phone may be used to request a webpage being served by a remote web server. Such a request may be communicated via a wireless, cellular network, to a wired data network connected to a datacenter of the webpage provider. Similarly, the request may be forwarded within the datacenter to one or more servers via an intra-datacenter network. In some cases, the servers within the datacenter may communicate with those of another datacenter via an inter-datacenter network. Thus, data may be communicated between computing devices using any number of different types of data networks, such as wireless networks, wired electronic networks, wired optical networks that use pulses of light to transmit data, and other forms of data networks.

SUMMARY

Implementations of the systems and methods for validating a connection to an optical circuit switch are described herein. One implementation is a method for validating a connection to an optical circuit switch. The method includes generating, by a processing circuit, a packet of data. The method also includes providing the packet of data to a first connection to the optical circuit switch, the first connection including a wired connection to a first port of the optical circuit switch. The method further includes determining, by the processing circuit, whether the packet of data was communicated through the optical circuit switch to a second connection to the optical circuit switch, the second connection including a wired connection to a second port of the optical circuit switch. The method yet further includes selecting the first connection based in part on a determination that the packet of data reached the second connection. The method additionally includes retesting the selected first connection by communicating a second packet of data through the first connection to a third connection to the optical circuit switch, the third connection including a wired connection to a third port of the optical circuit switch. The method further includes generating data indicative of the first connection being correctly wired based in part on a determination that the second packet reached the third connection.

Another implementation is a system for validating a connection to an optical circuit switch. The system includes a processing circuit operable to generate a packet of data and provide the packet of data to a first connection to the optical circuit switch, the first connection including a wired connection to a first port of the optical circuit switch. The processing circuit is also operable to determine whether the packet of data was communicated through the optical circuit switch to a second connection to the optical circuit switch, the second connection including a wired connection to a second port of the optical circuit switch. The processing circuit is further operable to select the first connection based in part on a determination that the packet of data reached the second connection. The processing circuit is additionally operable to retest the selected first connection by communicating a second packet of data through the first connection to a third connection to the optical circuit switch, the third connection including a wired connection to a third port of the optical circuit switch. The processing circuit is also operable to generate data indicative of the first connection being correctly wired based in part on a determination that the second packet reached the third connection.

A further implementation is a computer-readable storage medium having machine instructions stored therein, the instructions being executable by a processor to cause the processor to perform operations. The operations include generating a packet of data and providing the packet of data to a first connection to the optical circuit switch, the first connection including a wired connection to a first port of the optical circuit switch. The operations also include determining whether the packet of data was communicated through the optical circuit switch to a second connection to the optical circuit switch, the second connection including a wired connection to a second port of the optical circuit switch. The operations further include selecting the first connection based in part on a determination that the packet of data reached the second connection. The operations yet further include retesting the selected first connection by communicating a second packet of data through the first connection to a third connection to the optical circuit switch, the third connection including a wired connection to a third port of the optical circuit switch. The operations additionally include generating data indicative of the first connection being correctly wired based in part on a determination that the second packet reached the third connection.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
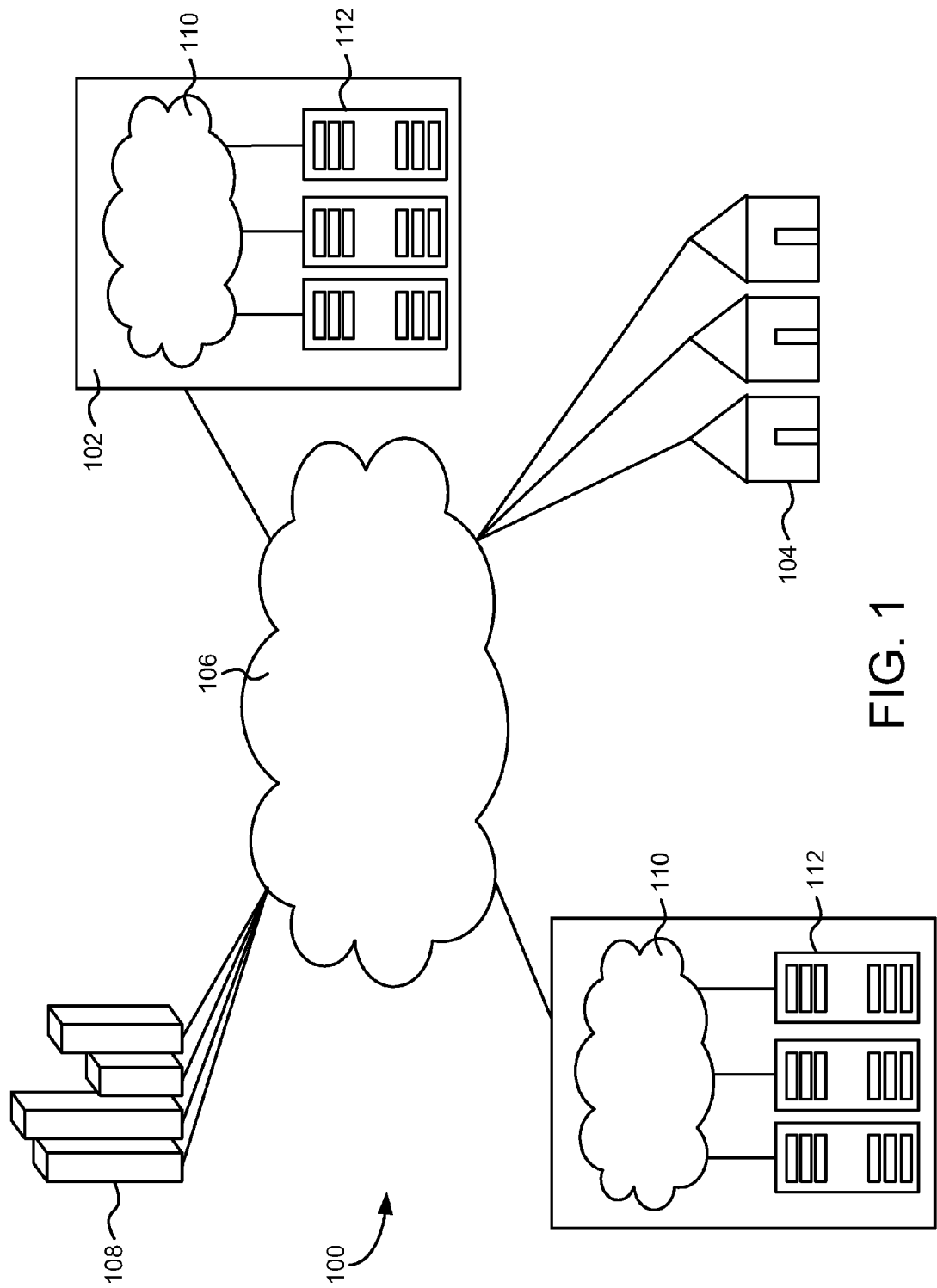
FIG. 1 is an example illustration of a computing system, according to some implementations.

According to various implementations, an optical circuit switch (OCS) may be used within a data network. For example, an OCS may be used as a smart patch panel within a datacenter or other location, allowing different network topologies to be created dynamically. Connections to an OCS may be hardwired to other networking devices, such as routers, switches, and servers that use any of a variety of protocols. In one example, electronic packet switching (EPS) ports of an Ethernet switch may be connected to ports of an OCS via cabling. Once wired, different network topologies can be created dynamically by changing the cross connections within the OCS. In other words, the network topology may be changed dynamically via control of the OCS, without requiring manual changes to the network cabling.

The installation of wired connections to and from an OCS may be subject to technician error. If a technician makes a connection to the wrong port of the OCS, the network topology may not match the expected topology and data may not arrive at its intended destination. For example, assume that the OCS is controlled such that data is to be communicated between EPS ports connected to the OCS. Such an intended pathway may be port EPS-1→port OCS-1→port OCS-5→port EPS-2. However, assume that port EPS-1 is wired incorrectly to port OCS-2. During transmission of the data, it may actually follow the pathway: port EPS-1→port OCS-2→port OCS-4→port EPS-3. In other words, the incorrect wiring may result in the data arriving at EPS-3 instead of EPS-2.

A connection to an OCS that has been verified to be wired correctly may be used as a baseline to test other wired connections. For example, if the connection between port EPS-1 and port OCS-1 is verified to be correctly wired, connections to other ports of the OCS may be tested by attempting to send data to port EPS-1 via the other connections or vice-versa. For example, the connection between ports OCS-5 and port EPS-2 may be made by cross connecting ports OCS-1 and OCS-5 within the OCS and attempting to send data from port EPS-1 to EPS-2. If the test data is received at port EPS-2, the connection between OCS-5 and EPS-2 is also correctly wired. However, if the test data is not received at port EPS-2, the connection between OCS-5 and EPS-2 must be incorrectly wired. In some cases, a technician may manually verify that a connection is correctly wired, to establish such a baseline connection. However, like the original installation of the cabling, such a verification may still be subject to technician error.

Various implementations are disclosed that allow a connection to an OCS to be verified automatically (i.e., without requiring a technician to manually verify the connection in the field). A basic assumption may be made that less than 50% of the connections to the OCS are incorrectly wired. In such a case, the connections may be tested iteratively by sending a test packet of data through the OCS. A pair of connections may be deemed incorrectly wired if the test packet does not arrive at the expected destination. If the test packet arrives at the expected destination, one of the two connections may be selected for advancement to the next round. With each successive round, the probability of an incorrectly wired connection advancing to the next round decreases considerably. In some implementations, a connection may be identified as being correctly wired when its associated probability drops below a specific threshold. In other implementations, the iterative testing may be repeated until a single connection remains (i.e., the connection having the lowest probability of being incorrectly wired). In either case, a connection determined to be wired correctly may then be used as a baseline to test the other connections to the OCS.

Referring to FIG. 1, an example illustration of a computing system 100 is shown, according to some implementations. As shown, a network 106 may convey data between various locations. For example, network 106 may convey data between datacenters 102, residential buildings 104, and additional networks 108 (e.g., networks of corporate, educational, or government facilities, etc.).

Network 106 may include some or all of the infrastructure that supports long-range data communication, such as the Internet and/or other types of data networks. For example, network 106 may include any number of smaller networks such as local area network (LANs), metropolitan area networks (MANs), wide area networks (WANs), cellular networks, and satellite networks. The infrastructure of network 106 may also include any number of computing devices (e.g., computer, servers, routers, network switches, wireless transceivers, etc.) that are configured to receive and/or transmit data within network 106. Network 106 may further include any number of hardwired and/or wireless connections. For example, a computing device may communicate over a wireless connection (e.g., via WiFi, cellular, radio, etc.) with a transceiver that is hardwired (e.g., via a fiber optic cable, a CAT5 cable, etc.) to other computing devices in network 106.

Datacenters 102 may include any number of interconnected computing devices 112, such as web servers, database servers, cloud computing storage devices, etc. Computing devices 112 may be arranged in repetitive modules, clusters, or groups according to their functions and/or resource requirements. For example, computing devices 112 may be arranged such that racks of servers having similar cabling or power requirements are placed in the same locations. However, other arrangements of computing devices 112 within datacenters 102 are also possible.

Each of datacenters 102 may be a single building or a campus of multiple buildings. In some implementations, computing devices 112 at each location may be connected by an area networks 110. Area networks 110 may be LANs or campus area networks (CANs) that include one or more LANs. Area networks 110 may include any number of hardware devices configured to transmit data among computing devices 112 (e.g., routers, switches, wireless transceivers, etc.). Area networks 110 may also include hardware to interface with network 106. For example, area networks 110 may include gateways and other hardware to transmit data between network 106 and area networks 110.

Residential buildings 104 may be connected to network 106 via any number of data communication networks. For example, residential buildings 104 may be wired to communicate via dial-up modems, digital subscriber lines (DSL), cable modems, etc. with network 106. In other examples, residential buildings 104 may be located within the coverage area of a wireless network, such as a public WiFi network, a cellular network, or similar wireless network.

Networks 108 may also be connected to network 106, allowing computing devices in government, commercial, and similar locations to communicate with other devices in computing system 100. For example, a computer connected to one of networks 108 may request a webpage served by computing devices 112. Such a request may be passed from networks 108, to network 106, to one of area networks 110, and on to computing devices 112. In response, computing devices 112 may return webpage data to the requesting device via area networks 110, network 106, and networks 108.

According to various implementations, some or all of computing system 100 may utilize fiber optic cables to convey data. In general, fiber optic cables allow for the high-bandwidth transfer of data, in comparison to copper cabling and other similar communications media. However, fiber optic technology has not been adopted universally due to various factors such as installation costs, maintenance considerations (e.g., a fiber optic cable may be more difficult to splice than a copper cable), and other factors. For example, area networks 110 of datacenters 102 may utilize fiber optics for the high-speed transmission of data between computing devices 112 and/or parts of other networks 108 may utilize fiber optics as part of a LAN. In some cases, residential buildings 104 may be connected to network 106 via fiber optics. However, fiber optics networks for consumer use are still unavailable in many locations.

Data may be passed to and from a fiber optic network via specialized hardware. For example, such a network may include an OCS to provide switching capabilities within the fiber optic network. Also known as a photonic switch, an OCS generally operates by directing beams of light to different ports of the OCS. For example, an OCS may utilize micro-electromechanical system (MEMS) motors to control the positioning of silicon mirror in a mirror array. Beams passing through the OCS may then be directed by the mirror array. Since the mirror array is controllable, reconfiguration of the internal connections within the OCS may be made dynamically. In some cases, an OCS may be operable to allow an optical connection between any two optical ports of the OCS by control of its internal mirrors. Another similar approach uses piezoelectric actuators to steer the optical beams in free space between different optical ports of an OCS.

Figure 2:
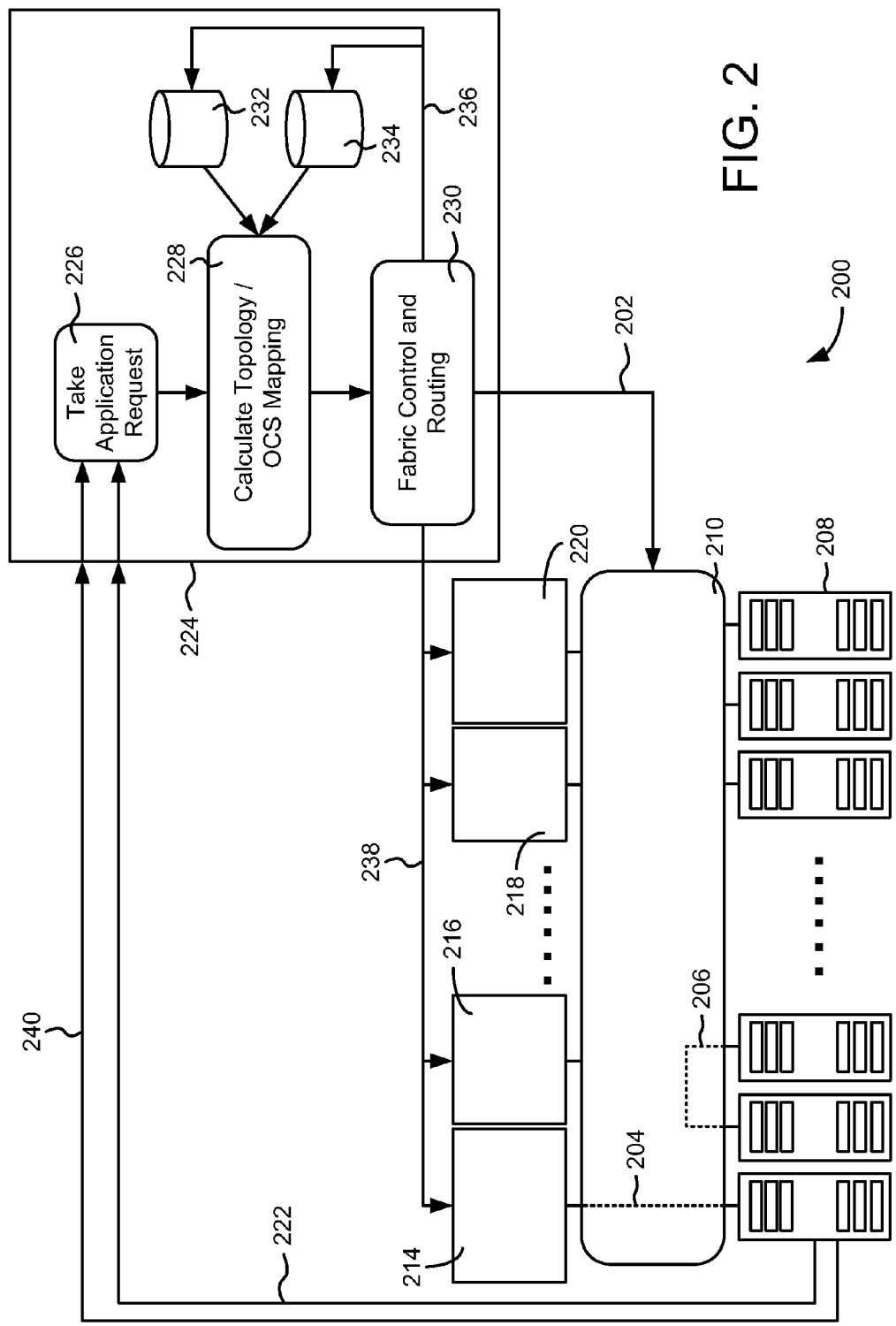
FIG. 2 is a block diagram of an optical circuit switched network architecture, according to one implementation.

Referring now to FIG. 2, a block diagram of an optical circuit switched network architecture 200 is shown, according to one implementation. Network architecture 200 may be implemented, for example, within a datacenter, such as datacenters 102 shown in FIG. 1. However, network architecture 200 may also be deployed in other fiber rich facilities such as high-degree backbone points of presence (POP) or in other fiber optic networks. In general, network architecture 200 utilizes a hybrid approach that utilizes both optical and electrical switching infrastructure. Dynamic control of an OCS 210 allows the topology of network architecture 200 to be reconfigured dynamically without having to rewire the network.

OCS 210 may include any number of optical ports connected to packet processing nodes 214-220 (e.g., a first through nth packet processing node) and to server groups 408, according to one implementation. Server groups 208 may be any set of servers that are associated in some manner. For example, server groups may share a server network interface or may be located in a common location, such as the same server rack. Packet processing nodes 214-220 and server groups 208 may be connected to optical ports of OCS 210 by fiber optic cables. In one implementation, OCS 210 may be a non-blocking optical circuit switch such that any functional optical port on the optical circuit switch can optically connect with any other functional optical port of OCS 210. Accordingly, OCS 210 may provide one or more optical links 206 among the devices in server group 208. OCS 210 may also provide one or more optical links 204 between server group 208 and packet processing nodes 214-220. In further implementations, OCS 210 may provide one or more optical connections between packet processing nodes 214-220 (not shown). Optical links 204, 206 may be made directly between OCS 210, processing nodes 214-220, and server group 208, or may include optical converters, multiplexers, amplifiers, or other forms of equipment.

Packet processing nodes 414-420 may include hardware devices configured to communicate over electrically switched networks. For example, packet processing nodes 214-220 may include high performance routers, Infiniband switches, Ethernet switches, commodity top of rack switches, or any other forms of hardware configured to determine a packet's destination. In one example implementation, optical links 204 may connect EPS ports of an Ethernet switch in packet processing nodes 214-220 to OCS 210 via fiber optic cabling. Since OCS 210 is configured to allow its internal optical connections to be reconfigured dynamically, the topology of network architecture 200 may also be changed dynamically, without having to rewire the respective devices.

According to one implementation, a network controller 204 may provide control over the network topology of network architecture 200. Network controller 204 may be one or more computing devices that form a processing circuit configured to perform the functions described herein. Such a processing circuit may include one or more processors in communication with computer storage devices that store machine instructions that, when executed, cause the one or more processors to perform the described functions. For example, network controller 204 may include software modules such as a fabric control and routing module 230 and a topology/OCS mapping module 228. In some implementations, modules 228-230 may include separate OCS manager and EPS manager modules to independently calculate topology for, and control of, OCS 210 and EPS devices within packet processing nodes 214-220. For example, an EPS manager in module 230 may program all EPS devices in packet processing nodes 214-220 and receive data from the devices, such as system and port state updates, port and flow counters, and similar data from the EPS devices. An EPS manager in module 228 may also update the logical topology state cache and the network state database maintained by network controller 204. Similarly, an OCS manager in module 230 may implement a calculated topology received from module 228 and monitor all OCS devices, such as OCS 210. The network control software may reside on one or more computing devices in network controller 224 or may be embedded in OCS 210, according to various implementations.

The port cross connections of OCS 210 may be reconfigured according to a control signal 202 transmitted from network controller 224 to OCS 210. Control signal 202, as well as control signals 238 sent to packet processing nodes 214-220, may be determined by network controller 224. Control signals 238 and 202 may include instructions directing programmable devices included therein to implement a preferred optical link topology or a preferred oversubscription ratio, according to some implementations. For example, network controller 224 may receive bandwidth requests 222 and/or topology requests 240 from one or more devices in server group 208. Requests 222, 240 may be generated in response to applications executed on server groups 408 or one or more requests from network operators providing access to server groups 408.

On reception of requests 222 and/or 240 at reception module 226 of network controller 224, the requests may be formatted prior to being provided to module 228. Module 228 may be configured to monitor real time communication patterns, estimate Internet traffic, and calculate new topologies or OCS configurations based on traffic data and traffic calculations. According to one implementation, module 228 may determine a preferred optical link topology for OCS 210 that includes all of the optical data link connections between the input and output ports of OCS 210, such as optical links 204 and 206, for example. Module 228 may also determine a preferred oversubscription ratio for packet processing nodes 214-220 that contributes to the overall preferred optical link topology for OCS 210. A particular optical link topology or oversubscription ratio may be determined to maximize efficiency of available resources, give priority to particular applications running in server group 208, or prevent a bandwidth bottleneck at any particular switch or packet processing node, in various examples.

In addition to requests 222, 240, module 228 may determine a preferred optical link topology and oversubscription ratio based on the current optical link topology 232. Similarly, module 228 may base the determinations on status data 234 indicative of the current statuses of the switches in packet processing nodes 214-220 and of OCS 210. In some implementations, module 230 may provide status data 234 and the current optical link topology 232 to module 228, thereby creating a feedback loop 236.

According to one implementation, network controller 224 may monitor OCS 210 for optical link faults. If any optical link faults are detected, they are forwarded to module 228, so that faulty links can be excluded from use when determining the preferred optical link topology and/or preferred oversubscription ratio. Faults may be detected, for example, by a power monitoring mechanism at the optical ports of OCS 210. Similarly, data indicative of unavailable or unused ports may be provided by OCS 210 to module 228 and used as part of the determination. For example, ports associated with servers being upgraded or otherwise under maintenance may be excluded by module 228 when determining a topology or oversubscription ratio.

Once a preferred optical link topology for OCS 210 and/or a preferred oversubscription ratio for packet processing nodes 214-220 are determined by module 228, the preferred topology and/or oversubscription ratio may be used by module 230 to determine an optical port map. An optical port map may be determined by translating the preferred optical link topology and preferred oversubscription ratio into a set of OCS port connections corresponding to the optical ports of OCS 210. These port connections may be used to program the mechanical or electro-optical switching mechanisms within OCS 210 and used to direct its internal optical pathways. Once an optical port map is determined by module 230, the port map may be sent to OCS 210 as part of control signal 202. Similarly, the port map may also be sent to packet processing nodes 214-220, so that the ports of the switches in these nodes are coordinated with those of OCS 210.

While network architecture 200 allows for the dynamic reconfiguration of its network topology through the control of OCS 210, this functionality requires the physical cabling of packet processing nodes 214-220 and server group 208 to be wired to the correct ports of OCS 210. During installation of network architecture 200, technicians may install that various cabling from OCS 210 to packet processing nodes 214-220 and server group 208. However, a modern OCS can have hundreds of optical ports. If a technician accidentally swaps the cabling between two ports, control of the optical paths in the OCS may result in data arriving at the wrong destination. In other words, the optical port map used to control the OCS may not reflect the actual wiring of the OCS ports, due to technician error.

According to various implementations, incorrectly wired connections to OCS 210 may be identified using a baseline connection that has been verified as being correctly wired. In some implementations, test packets may be communicated through OCS 210 and data may be collected regarding whether a test packet reached its intended destination (e.g., by network controller 224 or another computing device). Optical pathways within OCS 210 may be controlled by network controller 224 during the testing according to the expected port wirings.

Referring now to FIGS. 3A-3D, illustrations of different connections to an optical circuit switch are shown, according to various examples. FIGS. 3A-3D depict various wiring scenarios to four different optical ports 304-308 of an OCS 302. While four ports are depicted in FIGS. 3A-3D, OCS 302 may include any number of optical ports that may or may not be wired, in addition to the depicted connections. As shown, the optical pathways within OCS 302 may be controlled such that optical port 304 is connected to optical port 306 via an optical pathway 320 and optical port 308 is connected to optical port 310 via an optical pathway 322. Such a configuration may be based, for example, on an optical port map used by OCS 302 to position internal mirrors to create optical pathways 320, 322.

In the examples shown in FIGS. 3A-3D, wired connections may be made between EPS ports 312, 316 of one or more Ethernet switches (i.e., as part of a packet switching network) and OCS 302. While Ethernet packet switching is used in the examples shown, other forms of networks may similarly be connected to OCS 302. For illustrative purposes only, assume that the intended goal is to communicate data from EPS port 312 to EPS port 316 via OCS 302. One potential way to verify whether optical ports 304-310 are wired correctly is to send a test packet between ports 312, 316 via OCS 302. However, the results of the test may differ, depending on the wiring configurations to OCS 302.

Figure 3A:
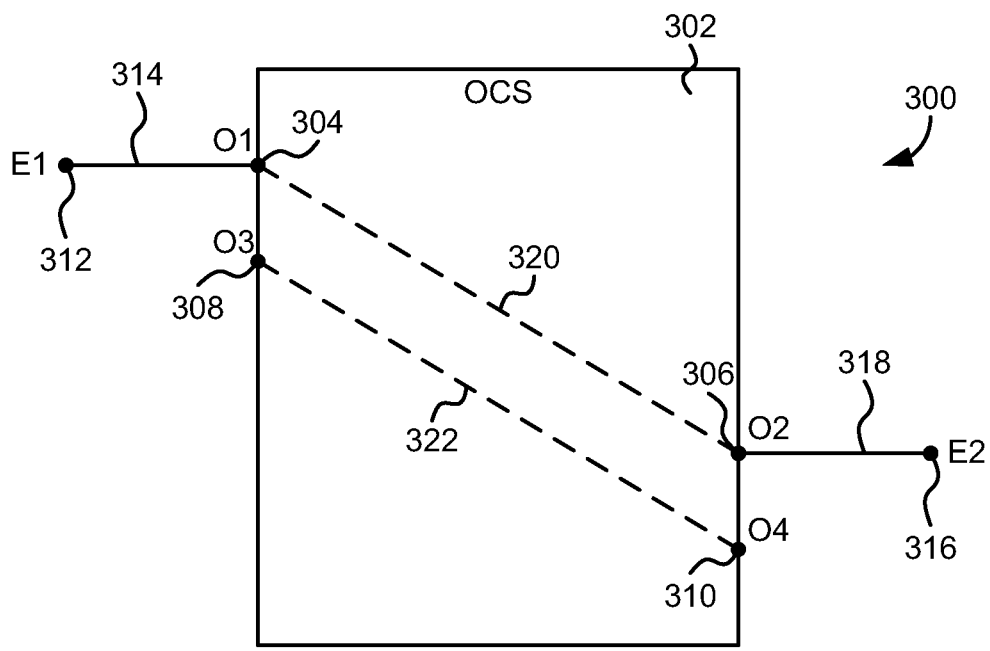
FIGS. 3A-3D are illustrations of different connections to an optical circuit switch, according to various examples.

In illustration 300 of FIG. 3A, assume that EPS ports 312, 316 have been wired to the correct ports of OCS 302. A first connection 314 may be made between EPS port 312 and optical port 304 of OCS 302. Similarly, a second connection 318 may be made between EPS port 316 and optical port 306 of OCS 302. Based on connections 314, 318, OCS 302 may be controlled to create optical pathway 320 between optical ports 304, 306. Thus, a test packet of data transmitted from EPS port 312 may correctly reach EPS port 316 via transmission through connections 314, 318 and optical pathway 320 within OCS 302.

Figure 3B:
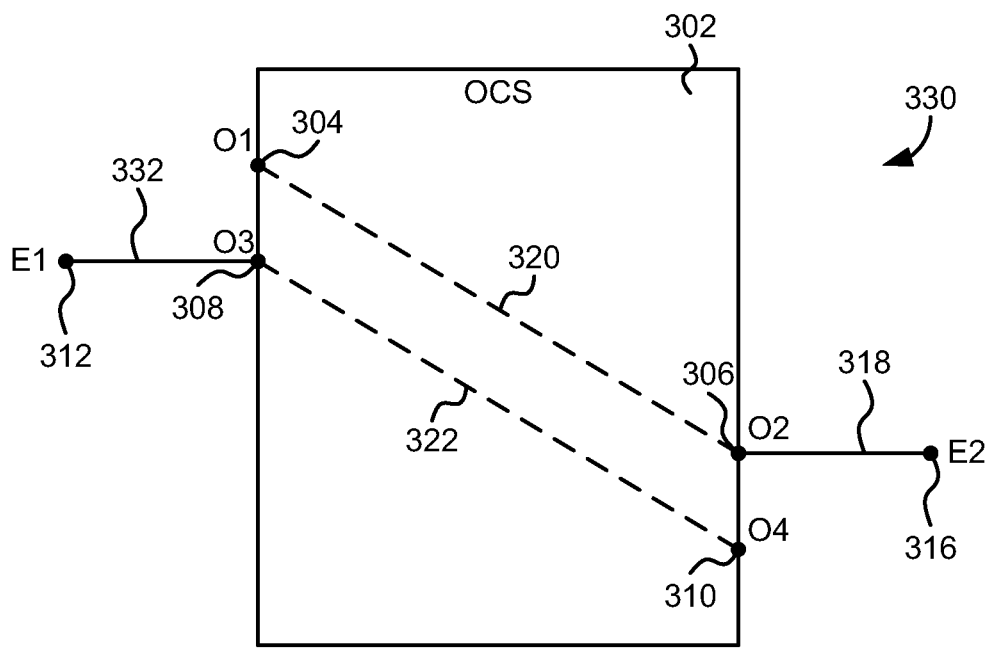

In illustration 330 of FIG. 3B, connection 318 may be wired correctly between EPS port 316 and optical port 306 of OCS 302. However, assume that a connection 332 is incorrectly wired between EPS port 312 and optical port 308 of OCS 302. Since the optical pathways in OCS 302 are configured based on OCS 302 being wired correctly, the test packet may be communicated via optical pathway 322 instead of optical pathway 320. In such a case, a test packet sent from EPS port 312 may not arrive at EPS port 316, since it would be communicated within OCS 302 to optical port 310 instead of optical port 306. Thus, connections 318, 332 may be identified as potentially containing wiring errors.

Figure 3C:
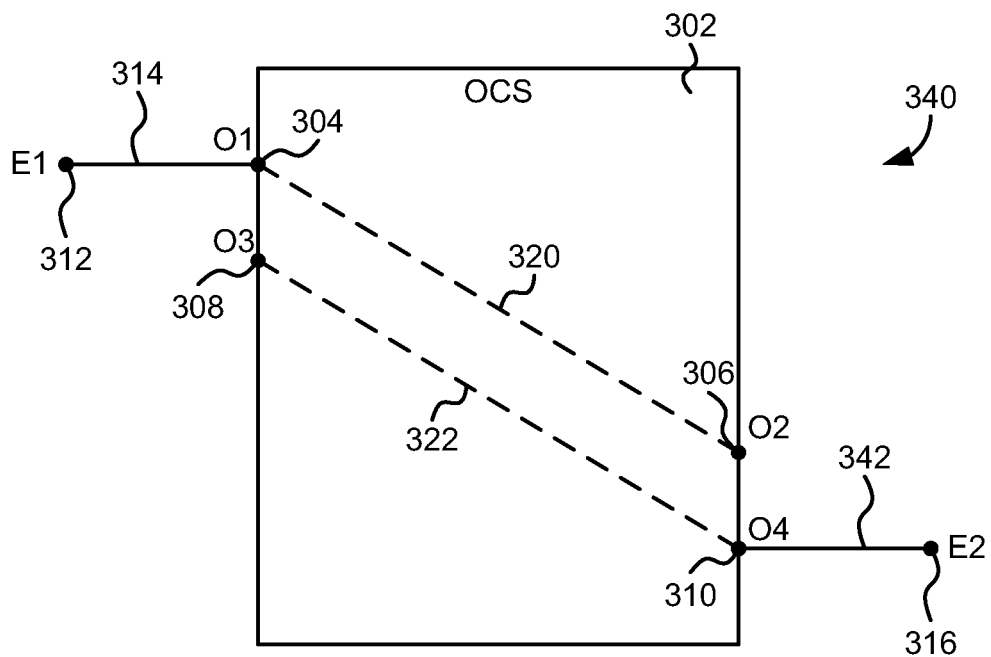

In illustration 340 of FIG. 3C, the opposite situation as illustration 330 is shown. Here, connection 314 is correctly wired between EPS port 312 and optical port 304 of OCS 302. However, EPS port 316 is incorrectly wired to optical port 310 of OCS 302 via a connection 342. Similar to the case depicted in illustration 330, a test packet send from EPS port 312 would not reach its intended destination, since EPS port 316 is not connected to optical port 306. As a result, connections 314, 342 may be identified as potentially containing wiring errors.

Figure 3D:
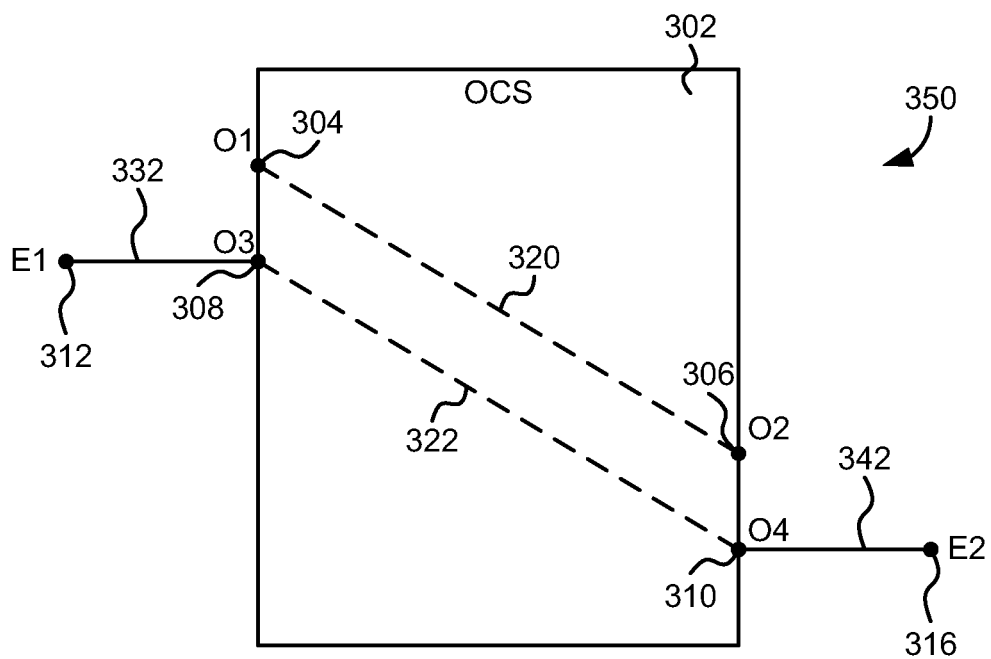

In illustration 350 of FIG. 3D, a situation is shown in which a test packet may arrive at its intended destination, but via incorrectly wired connections. As shown, EPS port 312 may be incorrectly connected to optical port 308 of OCS 302 via connection 332. Similarly, EPS port 316 may be incorrectly connected to optical port 310 of OCS 302 via connection 342. However, the optical pathways within OCS 302 may be configured such that another optical pathway may cancel out the effects of the incorrect wiring of connections 332, 342. For example, multiple ports of OCS 302 may be tested concurrently by configuring multiple optical pathways within OCS 302. If optical pathway 322 connects optical ports 308, 310 when a test packet of data is sent from EPS port 312, it may correctly arrive at EPS port 316. Thus, the test may indicate that connections 308, 310 are wired correctly, even though they are not.

From the examples shown in FIGS. 3A-3D, four possible situations are possible for a packet of data being used to test a pair of connections to an OCS:

TABLE 1

| EPS port 1 | EPS port 2 | Test Results |
|---|---|---|
| Correct | Correct | Pass |
| Correct | Incorrect | Fail |
| Incorrect | Correct | Fail |
| Incorrect | Incorrect | Pass or Fail |

According to various implementations, connections to an OCS may be tested iteratively, to identify a connection that is correctly wired. In general, the number of connections to the OCS tested in each round may continually decrease. As connections survive each round of the testing, the probability that one of the surviving connections is incorrectly wired decreases rapidly. For example, both connections in a failed test may be excluded from further rounds of testing. If a test packet reaches its destination correctly, one of the two connections from that test may be selected for advancement to the next round. After each subsequent round of testing, the probability of an incorrectly wired connection advancing to the next round will also continue to decrease. After a threshold number of rounds or a threshold probability is reached, the surviving connections may be deemed as being correctly wired. In other implementations, the process may be repeated until a single connection remains.

Let x be the probability that a connection is incorrectly wired. For an incorrectly wired connection to advance to the next round of testing, both connections must be incorrectly wired. Therefore, the probability that of an incorrectly wired connection advancing to the second round of testing is $P(2)=x^2$. For round n, the probability is $P(n)=x^{(2*(n-1))}$. Assuming that the probability of a connection being incorrectly wired is less than 50%, each subsequent round of testing will result in the probability of the surviving connections decreasing. In most deployments, the actual probability may be far less than 50%. For example, assume that the probability of a connection being incorrectly wired is 10%. In such a case, the probability of the connection surviving subsequent rounds of testing are as follows: $P(2)=1\%$, $P(3)=0.01\%$, $P(4)=0.0001\%$, etc. In some implementations, a surviving connection may be identified as being correctly wired after a certain number of rounds have been completed or the probability of it being incorrectly wired drops below a given threshold (e.g., if the probability is less than 0.0001%, 0.0000001%, etc.).

Once a connection has been identified as being correctly wired, other connections may be verified by attempting to transmit a packet of data over the correctly wired connection and one of the other connections. If the packet reaches its destination, the other connection may be verified as also being correctly wired. However, if the packet does not reach its destination, the other connection may be flagged as being incorrectly wired.

Figure 4:
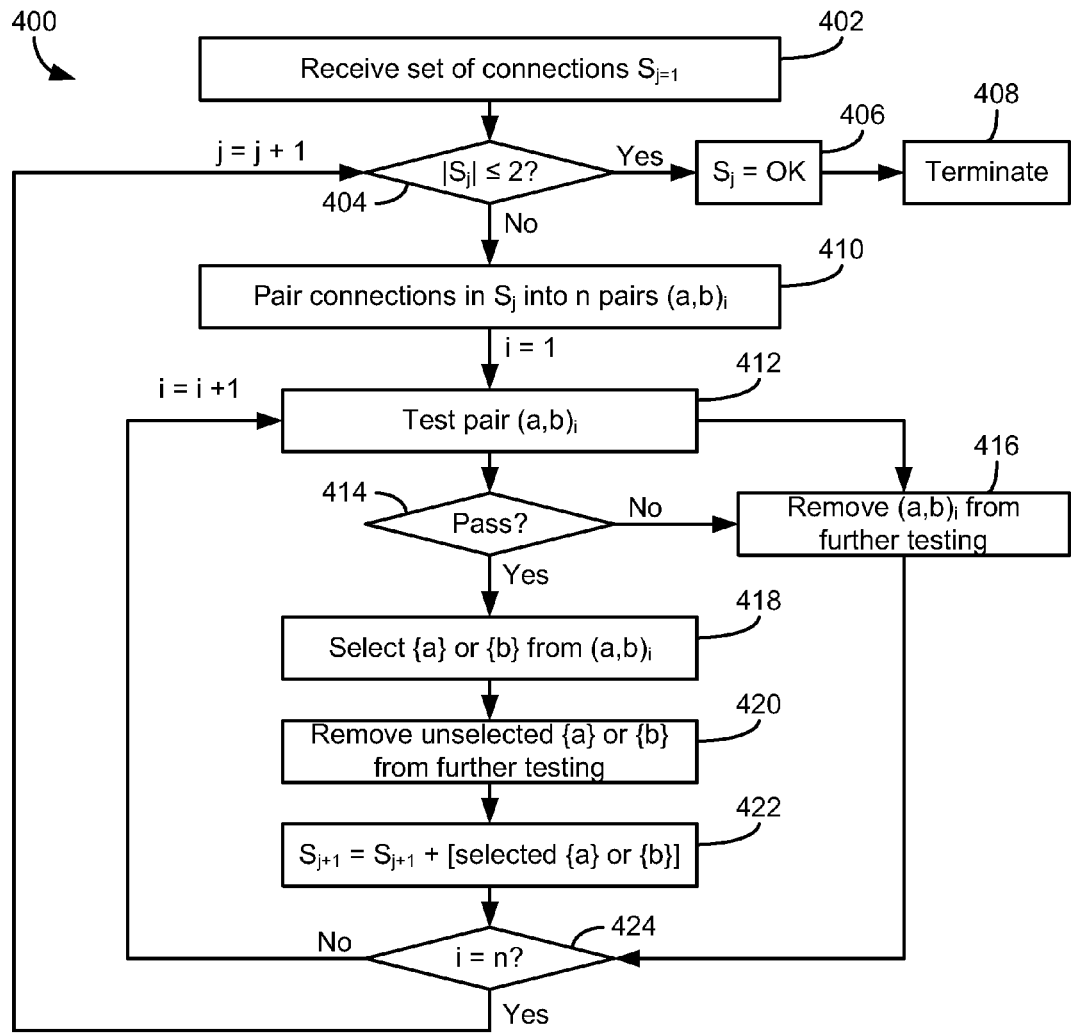
FIG. 4 is a diagram of a process for identifying a correctly wired connection to an optical circuit switch, according to some implementations.

Referring now to FIG. 4, a diagram of a process 400 for identifying a correctly wired connection to an optical circuit switch is shown, according to some implementations. Process 400 may be implemented by one or more networked devices configured to generate packets of data and to analyze whether a packet arrived at its destination.

Process 400 includes receiving a set of connections $S_{j=1}$, representing connections to ports of an OCS that are to be tested (block 402). For example, set $S_{j=1}$ may include data representing optical ports of the OCS and/or ports of other networking devices connected to the OCS. As used in FIG. 4, the symbol j is used to represent the current round of testing for the connections.

As shown, the number of connections in set $S_j$ may be analyzed at the beginning of each round of testing (block 406). If the number of connections in $S_j$ is less than or equal to two, the remaining connection or connections may be identified as being wired correctly (block 406). In such a case, process 400 may then terminate (block 408). In other implementations, the decision in block 406 may be replaced with a test based on the number of completed rounds of testing. For example, blocks 406 and 408 may be executed if j=5, j=10, or j has reached a defined threshold number of rounds. Similarly, a probability threshold may be used. Such a threshold may be based on the number of completed rounds and an estimated probability of a connection being incorrectly wired. For example, blocks 406 and 408 may be executed if P(j=4)=0.0001%.

If the number of connections in $S_j$ is greater than two, the connections in $S_j$ may be paired into n number of pairs (a, b)$_i$, where the symbol i represents the ith pair (block 410). In some cases, the number of connections in $S_j$ may be odd. If so, one of the connections may be excluded from further rounds of testing. Alternatively, one of the connections in $S_j$ may be paired twice for purposes of the current round. Pairs (a, b)$_j$ may be selected randomly or may be based on which optical pathways are possible within the OCS. In other words, the OCS may be configured such that optical pathways connect the optical port associated with connection a to the optical port associated with connection b.

For each of the pairs of connections (a, b)$_i$, a packet of data may be sent through one of the connections to the other connection (block 412). The results of the test may then be analyzed to determine whether the packet arrived at its intended destination (block 414). If the packet does not reach its destination, both connections in the pair may be removed from further rounds of testing, since at least one of the connections is incorrectly wired (block 416). In some implementations, the pair of connections may also be flagged as containing an incorrectly wired connection.

If the packet of data arrived at its intended destination, one of the connections in the tested pair may be selected for advancement to the next round of testing (block 418). In some implementations, the sending or the receiving connection may be selected for advancement. For example, connection a may always be selected, connections a and b may be selected in an alternating fashion, or a passing connection may be selected according to some other pattern (e.g., connection b is selected from every third pair that passes, connection a is selected if the current round is an even number, etc.). In other implementations, one of the connections in the pair may be selected randomly for advancement to the next round of testing. The unselected connection may then be removed from further rounds of testing (block 420). By removing one of the two passing connections, the probability of an incorrectly wired connection advancing to the next round will decrease if the probability of any given connection being incorrectly wired is less than 50%.

The selected connection from a passing pair of connections may be added to a set of connections $S_{j+1}$ for use in the j+1 round of testing (block 422). At most, the size of $S_{j+1}$ will be half that of $S_j$, since one of the two connections in a passing pair is removed from further testing. If the test of any of the pairs fails, $S_{j+1}$ will contain less than half of the number of connections in $S_j$. For example, an OCS having 320 ports may take up to eight rounds of testing to eliminate all but one connection.

After evaluation of pair $(a,b)_i$ is complete, a decision may be made as to whether any untested pairs remain for the current round (block 424). If so, process 400 may proceed to block 412 to test the next pair of connections in the current round. Otherwise, the round has completed and set $S_{j+1}$ may be used in the next round of testing. In this way, iterative rounds of testing may be conducted in process 400 until a correctly wired connection is identified and process 400 terminates. Since the resulting connection has a high probability of being correctly wired, it may be used as a baseline to then test the other connections to the OCS.

Figure 5:
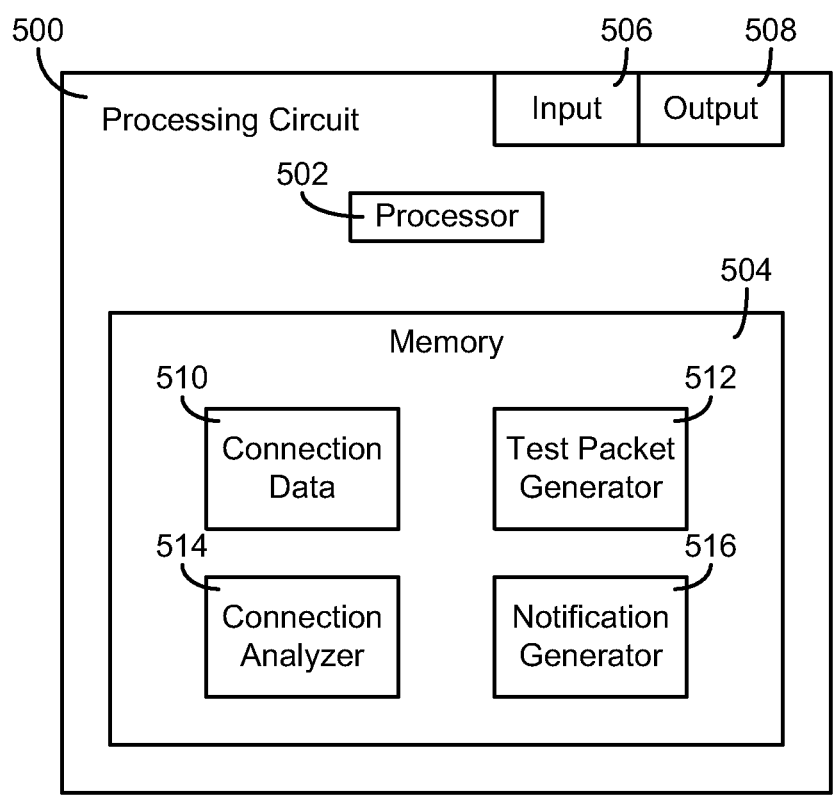
FIG. 5 is a schematic diagram of a processing circuit configured to identify a correctly wired connection to an optical circuit switch, according to various implementations.

Referring now to FIG. 5, a schematic diagram of a processing circuit 500 configured to identify a correctly wired connection to an OCS is shown, according to various implementations. Processing circuit 500 may be a component of a network controller, another computing device connected to a network. Processing circuit 500 includes processor 502 and memory 504. Processor 502 may be or include one or more microprocessors, an application specific integrated circuit (ASIC), a circuit containing one or more processing components, a group of distributed processing components, circuitry for supporting a microprocessor, or other hardware configured for processing data. Processor 502 is also configured to execute computer code stored in memory 504 to complete and facilitate the activities described herein. Memory 504 can be any volatile or non-volatile computer-readable medium capable of storing data or computer code relating to the activities described herein. For example, memory 504 is shown to include test packet generator 512, connection analyzer 514, and notification generator 516, which may be implemented using computer code (e.g., executable code, object code, source code, script code, machine code, etc.) configured for execution by processor 502. When executed by processor 502, processing circuit 500 is configured to complete the activities described herein. While test packet generator 512, connection analyzer 514, and notification generator 516 are shown within memory 504, one or more of the software modules may be stored and executed by a separate computing device, according to other implementations.

Processing circuit 500 also includes hardware circuitry for supporting the execution of the computer code test packet generator 512, connection analyzer 514, and notification generator 516. For example, processing circuit 500 includes hardware interfaces (e.g., output 508) for communicating test packets of data from test packet generator 512 to a connection of an OCS. Output 508 may also provide notifications (e.g., from notification generator 516) to one or more user electronic devices (e.g., a mobile device operated by a technician, a personal computer, etc.). Processing circuit 500 may also include an input 506 for receiving, for example, an indication of whether a test packet of data reached its destination and connection data 510 that includes data regarding the expected connections to the OCS.

Connection data 510 may be received from a user interface device (e.g., a keypad, a pointing device, a touch screen display, etc.) via input 506. For example, a technician or systems engineer may operate a user interface device to specify the expected connections to the OCS. In other implementations, connection data 510 may be received from another device, such as the OCS itself, a network controller, etc. Connection data 510 may also include data regarding the optical pathways within the OCS. For example, connection data 510 may include data regarding which optical port of the OCS is connected to another optical port of the OCS.

Connection analyzer 514 may analyze connection data 510 to determine which connections to the OCS are to be tested. For example, connection analyzer 514 may analyze all connections made to the OCS or only a subset of the connections. According to various implementations, connection analyzer 514 may iteratively test the connections using test packet generator 512. For example, connection analyzer 514 may implement process 400 shown in FIG. 4. Test packet generator 512 may generate a communicate a packet of data via output 508 that includes the path $E1 \rightarrow O1 \rightarrow O2 \rightarrow E2$, where O1 and O2 are optical ports of the OCS and E1 and E2 are EPS ports connected to the OCS. If the test packet arrives at E2, an indication of the receipt may be sent to connection analyzer 514 via input 506. In other implementations, test packet generator 512 may send a control command to another device via output 508 that causes the other device to generate a test packet of data. In further implementations, live data may be used by connection analyzer 514, instead of test packets of data.

During each round of testing, connection analyzer 514 may generate a set of pairs of connections and test the pairs using test packet generator 512. If connection analyzer 514 receives an indication that the packet arrived at its intended destination, connection analyzer 514 may advance one of the connections in the pair to the next round of testing. Any number of rounds may be performed by connection analyzer 514 before a connection is identified as being correctly wired. In some cases, connection analyzer 514 may use a threshold probability or number of rounds, before deeming a connection as being correctly wired. In other implementations, connection analyzer 514 may continue testing until two or less connections remain.

In some implementations, notification generator 516 may provide a notification of the correctly wired connection to another computing device via output 508. For example, notification generator 516 may provide an indication of the correctly wired connection to a device configured to use that connection as a baseline to test other connection. In other implementations, connection analyzer 514 may be configured to test the other connections with the correctly wired connection. For example, connections flagged as failing a particular test may be retested by connection analyzer 514 to identify which of the two connections in the pair is incorrectly wired. In such a case, notification generator 516 may provide a notification of the connections that were miswired to another device, such as a display, a portable device of a technician, a personal computer, or similar device used to notify a user of the miswired connections.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for validating a connection to an optical circuit switch comprising:
    generating, by a processing circuit, a packet of data;
    providing the packet of data to a first connection to the optical circuit switch, the first connection comprising a wired connection to a first port of the optical circuit switch;
    determining, by the processing circuit, whether the packet of data was communicated through the optical circuit switch to a second connection to the optical circuit switch, the second connection comprising a wired connection to a second port of the optical circuit switch;
    selecting the first connection for retesting based in part on a determination that the packet of data reached the second connection;
    retesting the selected first connection by communicating a second packet of data through the first connection to a third connection to the optical circuit switch, the third connection comprising a wired connection to a third port of the optical circuit switch;
    generating data indicative of the first connection being correctly wired based in part on a determination that the second packet reached the third connection;
    generating data indicative of the first connection being incorrectly wired based in part on a determination that the second packet of data did not reach the third connection; and
    generating data indicative of the second connection being incorrectly wired based in part on a determination that the second packet of data did not reach the third connection.

2. The method of claim 1, wherein the first connection is selected randomly for retesting from among the first and second connections.

3. The method of claim 1, further comprising:
    communicating the packet of data to the first port of the optical circuit switch via a port of an Ethernet switch.

4. The method of claim 1, further comprising:
    retesting the first connection one or more times after communicating the second packet, each of the one or more times corresponding to communicating an additional packet through the first connection, wherein the data indicative of the first connection being correctly wired is generated based on a determination that each of the one or more packets was received by an expected connection to the optical circuit switch.

5. The method of claim 4, further comprising:
    determining a probability value representing a probability that the first connection is incorrectly wired but has correctly communicated a number of packets; and
    using the probability value to determine a number of times the first connection is to be retested before the data indicative of the first connection being correctly wired is generated.

6. The method of claim 1, further comprising:
    using the data indicative of the first connection being correctly wired to test one or more other connections to the optical circuit switch.

7. A system for validating a connection to an optical circuit switch comprising a processing circuit configure to:
    generate a packet of data;
    provide the packet of data to a first connection to the optical circuit switch, the first connection comprising a wired connection to a first port of the optical circuit switch;
    determine whether the packet of data was communicated through the optical circuit switch to a second connection to the optical circuit switch, the second connection comprising a wired connection to a second port of the optical circuit switch;
    select the first connection for retesting based in part on a determination that the packet of data reached the second connection;
    retest the selected first connection by communicating a second packet of data through the first connection to a third connection to the optical circuit switch, the third connection comprising a wired connection to a third port of the optical circuit switch;
    generate data indicative of the first connection being correctly wired based in part on a determination that the second packet reached the third connection;
    generate data indicative of the first connection being incorrectly wired based in part on a determination that the second packet of data did not reach the third connection; and
    generate data indicative of the second connection being incorrectly wired based in part on a determination that the second packet of data did not reach the third connection.

8. The system of claim 7, wherein the first connection is selected randomly for retesting from among the first and second connections.

9. The system of claim 7, wherein the processing circuit is further operable to:
    communicate the packet of data to the first port of the optical circuit switch via a port of an Ethernet switch.

10. The system of claim 7, wherein the processing circuit is further operable to:

retest the first connection one or more times after communicating the second packet, each of the one or more times corresponding to communicating an additional packet through the first connection, wherein the data indicative of the first connection being correctly wired is generated based on a determination that each of the one or more packets was received by an expected connection to the optical circuit switch.

11. The system of claim 10, wherein the processing circuit is further operable to:
   determine a probability value representing a probability that the first connection is incorrectly wired but has correctly communicated a number of packets; and
   use the probability value to determine a number of times the first connection is to be retested before the data indicative of the first connection being correctly wired is generated.

12. The system of claim 7, wherein the processing circuit is further operable to:
   use the data indicative of the first connection being correctly wired to test one or more other connections to the optical circuit switch.

13. A non-transitory computer-readable storage medium having machine instructions stored therein, the instructions being executable by a processor to cause the processor to perform operations comprising:
   generating a packet of data;
   providing the packet of data to a first connection to the optical circuit switch, the first connection comprising a wired connection to a first port of the optical circuit switch;
   determining whether the packet of data was communicated through the optical circuit switch to a second connection to the optical circuit switch, the second connection comprising a wired connection to a second port of the optical circuit switch;
   selecting the first connection for retesting based in part on a determination that the packet of data reached the second connection;
   retesting the selected first connection by communicating a second packet of data through the first connection to a third connection to the optical circuit switch, the third connection comprising a wired connection to a third port of the optical circuit switch;
   generating data indicative of the first connection being correctly wired based in part on a determination that the second packet reached the third connection;
   generating data indicative of the first connection being incorrectly wired based in part on a determination that the second packet of data did not reach the third connection; and
   generating data indicative of the second connection being incorrectly wired based in part on a determination that the second packet of data did not reach the third connection.

14. The non-transitory computer-readable storage medium of claim 13, wherein the first connection is selected randomly for retesting from among the first and second connections.

15. The non-transitory computer-readable storage medium of claim 13, wherein the operations further comprise:
   communicating the packet of data to the first port of the optical circuit switch via a port of an Ethernet switch.

16. The non-transitory computer-readable storage medium of claim 13, wherein the operations further comprise:
   retesting the first connection one or more times after communicating the second packet, each of the one or more times corresponding to communicating an additional packet through the first connection, wherein the data indicative of the first connection being correctly wired is generated based on a determination that each of the one or more packets was received by an expected connection to the optical circuit switch.

17. The non-transitory computer-readable storage medium of claim 13, wherein the operations further comprise:
   using the data indicative of the first connection being correctly wired to test one or more other connections to the optical circuit switch.

18. A method for validating a connection to an optical circuit switch comprising:
   receiving data representative of a set of ports of an optical circuit switch that are to be tested;
   grouping the ports into pairs such that each port is assigned to at least one pair;
   for each pair of ports, performing an iterative test comprising:
      generating, by a processing circuit, a packet of data;
      providing the packet of data to a first connection to the optical circuit switch, the first connection comprising a wired connection to a first port of the pair of ports;
      determining, by the processing circuit, whether the packet of data was communicated through the optical circuit switch to a second connection to the optical circuit switch, the second connection comprising a wired connection to a second port of the pair of ports;
      selecting one of the first port and the second port for advancement to a subsequent round of testing, based in part on a determination that the packet of data reached the second connection;
   determining a total number of ports selected for advancement to the subsequent round of testing;
   responsive to determining that the total number of ports selected for advancement to the subsequent round of testing is greater than two:
      grouping ports selected for advancement to the subsequent round of testing into pairs such that each port is assigned to at least one pair; and
      repeating the iterative test for each pair of ports selected for advancement to the subsequent round of testing; and
   responsive to determining that the number of ports selected for advancement to the subsequent round of testing is less than or equal to two:
      generating data indicative of the connections associated with the ports selected for advancement to the subsequent round of testing being correctly wired.

* * * * *